(12) United States Patent
Wang et al.

(10) Patent No.: US 12,540,455 B2
(45) Date of Patent: Feb. 3, 2026

(54) WORKING MACHINE CONTROL METHOD USING TARGET POSITION CURVE AND REWARD MODEL, WORKING MACHINE CONTROL DEVICE AND WORKING MACHINE

(71) Applicant: Shanghai Sany Heavy Machinery Co., Ltd., Shanghai (CN)

(72) Inventors: Chuanyu Wang, Shanghai (CN); Lixin Hu, Shanghai (CN); Chao Zeng, Shanghai (CN)

(73) Assignee: Shanghai Sany Heavy Machinery Co., Ltd., Shanghai (CN)

( * ) Notice: Subject to any disclaimer, the term of this patent is extended or adjusted under 35 U.S.C. 154(b) by 451 days.

(21) Appl. No.: 18/065,804

(22) Filed: Dec. 14, 2022

(65) Prior Publication Data

US 2023/0112014 A1  Apr. 13, 2023

Related U.S. Application Data

(63) Continuation of application No. PCT/CN2022/102918, filed on Jun. 30, 2022.

(30) Foreign Application Priority Data

Aug. 19, 2021 (CN) .......................... 202110956947.X (51) Int. Cl.
*E02F 9/20* (2006.01)
(52) U.S. Cl.
CPC ................... *E02F 9/2025* (2013.01)
(58) Field of Classification Search
None
See application file for complete search history.

(56) References Cited

U.S. PATENT DOCUMENTS 5,826,666 A * 10/1998 Tozawa ................ E02F 3/437
                                                          172/7
11,237,558 B1 * 2/2022 Kikani ................. G06N 20/00
(Continued)

FOREIGN PATENT DOCUMENTS

CN         2782778 Y      5/2006
CN       102322080 A      1/2012
(Continued)

OTHER PUBLICATIONS

First Office Action issued in counterpart Chinese Patent Application No. 202110956947.X, dated Jun. 10, 2022.
(Continued)

*Primary Examiner* — James J Lee
*Assistant Examiner* — Tawri M McAndrews
(74) *Attorney, Agent, or Firm* — Westbridge IP LLC (57) ABSTRACT

Disclosed are a working machine control method and a device, and a working machine. The method includes: obtaining a current working state of a working machine; determining a current decision behavior of the work machine based on the current work state and a state-behavior decision model; and controlling, based on a control signal corresponding to the current decision behavior, the work machine to perform construction work. The state-behavior decision model is based on a sample working state, a sample decision behavior, and a reward value corresponding to the sample decision behavior. The reward value is determined based on an actual position curve and target position curve; the actual position curve is determined based on the sample decision behavior. The method, device and working machine reduce the adjusting workload of engineers, shorten the adjusting time, reduce the adjusting cost, and improve the intelligent construction level of the working machine.

15 Claims, 4 Drawing Sheets

(56) References Cited

U.S. PATENT DOCUMENTS

| | | | |
|---|---|---|---|
| 2019/0196854 A1 | 6/2019 | Hodel et al. | |
| 2020/0024828 A1* | 1/2020 | Asada | E02F 3/437 |
| 2021/0056659 A1* | 2/2021 | Ogura | G06V 20/52 |
| 2022/0049477 A1* | 2/2022 | Yamanaka | G06F 18/214 |

FOREIGN PATENT DOCUMENTS

| | | |
|---|---|---|
| CN | 105259888 A | 1/2016 |
| CN | 105714873 A | 6/2016 |
| CN | 106703110 A | 5/2017 |
| CN | 108951750 A | 12/2018 |
| CN | 109024751 A | 12/2018 |
| CN | 109778941 A | 5/2019 |
| CN | 112299254 A | 2/2021 |
| CN | 112302073 A | 2/2021 |
| CN | 112598150 A | 4/2021 |
| CN | 112947180 A | 6/2021 |
| CN | 112962709 A | 6/2021 |
| CN | 113684885 A | 11/2021 |
| JP | 2019183421 A | 10/2019 |
| JP | 2020082314 A | 6/2020 |
| WO | 2019222745 A1 | 11/2019 |
| WO | 2020203596 A1 | 10/2020 |

OTHER PUBLICATIONS

International Search Report issued in corresponding PCT Application No. PCT/CN2022/102918, dated Sep. 28, 2022.

* cited by examiner

WORKING MACHINE CONTROL METHOD USING TARGET POSITION CURVE AND REWARD MODEL, WORKING MACHINE CONTROL DEVICE AND WORKING MACHINE

CROSS-REFERENCE TO RELATED APPLICATIONS

This application n is a continuation of International Application No. PCT/CN2022/102918, filed on Jun. 30, 2022, which claims priority to Chinese Patent Application No. CN202110956947.X, filed on Aug. 19, 2021. The disclosures of the aforementioned applications are hereby incorporated by reference in their entireties.

TECHNICAL FIELD

The present disclosure relates to a technical field of mechanical engineering, and in particular, to a working machine control method, a working machine control device, and a working machine.

BACKGROUND

When an excavator performs combined operations, such as leveling ground or brushing slopes, it is usually completed by an experienced operator through combined actions.

In the related art, with the development of the intelligent function of the excavator, a traditional control algorithm is usually used for adjusting, many state points related to the work of the excavator need to be defined, and at each state point, it needs to adjust the control algorithm separately, so that a control program related leveling ground or brushing slopes achieve desired accuracy. Due to complexity of an excavator system, it is very difficult to adjust the control algorithm, and it is very difficult for engineers to complete it. Moreover, it is time-consuming and of high labor cost.

SUMMARY

The working machine control method, the working machine control device and the working machine provided by the present disclosure are used to solve the problem that when intelligently controlling the working machine in the prior art, it is necessary to establish an accurate control model for the working machine in each operation state and perform a large number of adjusting, which takes a long time, and is of high-cost.

The present disclosure provides a working machine control method, which includes:
  obtaining a current working state of a working machine;
  determining a current decision behavior of the work machine based on the current work state and a state-behavior decision model; and
  controlling, based on a control signal corresponding to the current decision behavior, the work machine to perform construction work;
  wherein the state-behavior decision model is obtained by training based on a sample working state of the work machine, a sample decision behavior of the work machine, and a reward value corresponding to the sample decision behavior; the reward value is determined based on an actual position curve of a working portion of the working machine; and a target position curve of the working portion; the actual position curve is determined based on the sample decision behavior.

According to the working machine control method provided by the present disclosure, the reward value is determined based on a coincidence degree between the actual position curve and the target position curve.

According to the working machine control method provided by the present disclosure, the reward value is positively related to the coincidence degree.

According to the working machine control method provided by the present disclosure, the coincidence degree is determined based on the following steps:
  selecting a plurality of position points on the actual position curve, and determining a plurality of corresponding position points, respectively corresponding to the plurality of position points, on the target position curve;
  determining a position weight of each position point; and
  determining the coincidence degree based on a distance between each one of the plurality of position points and corresponding one of the plurality of corresponding position points as well as the position weight of each position point.

According to the working machine control method provided by the present disclosure, the plurality of position points comprise any one of a starting point of the actual position curve, a midpoint of the actual position curve, an end point of the actual position curve, and an inflection point of the actual position curve.

According to the working machine control method provided by the present disclosure, the plurality of position points further comprise one or more segmented points.

According to the working machine control method provided by the present disclosure, the reward value is determined based on the following steps:
  determining the coincidence degree between the actual position curve and the target position curve;
  determining a moving speed of the working portion on the actual position curve; and
  determining the reward value based on the coincidence degree and the moving speed.

According to the working machine control method provided by the present disclosure, the reward value is positively related to the coincidence degree and the moving speed.

According to the working machine control method provided by the present disclosure, the determining the reward value based on the coincidence degree and the moving speed comprises:
  obtaining a weighted sum based on the coincidence degree, a coincidence-degree weight, the moving speed, and a moving-speed weight; and
  determining the weighted sum as the reward value.

According to the working machine control method provided by the present disclosure, the state-behavior decision model is obtained by training based on the following steps:
  obtaining a previous working state of the working machine, a previous decision behavior of the working machine, and a reward value corresponding to the previous decision behavior;
  taking the previous working state, the previous decision behavior, and the reward value corresponding to the previous decision behavior as the sample working state, the sample decision behavior, and the reward value corresponding to the sample decision behavior, respectively; and training, based on the sample working state, the sample decision behavior, and the reward value corresponding to the sample decision behavior, an initial model to obtain the state-behavior decision model.

According to the working machine control method provided by the present disclosure, the training, based on the sample working state, the sample decision behavior, and the reward value corresponding to the sample decision behavior, an initial model to obtain the state-behavior decision model includes:

stopping training if the coincidence degree between the actual position curve and the target position curve of the working portion of the working machine is smaller than a preset coincidence threshold, and taking the initial model trained as the state-behavior decision model.

According to the working machine control method provided by the present disclosure, the working machine is an excavator.

According to the working machine control method provided by the present disclosure, the current working state includes attitude parameters of machine arms, an attitude parameter of an upper body, and a rotation angle of the upper body.

According to the working machine control method provided by the present disclosure, the machine arms comprises a boom, a stick, and a bucket.

According to the working machine control method provided by the present disclosure, the working portion is a bucket of the excavator.

The present disclosure further provides an electronic device, which includes a memory, a processor, and a computer program stored on the memory and executable on the processor, wherein the processor implements the steps of the working machine control method when the processor executes the program.

The present disclosure further provides a working machine, which includes the electronic device.

The present disclosure further provides a non-transitory computer-readable storage medium, on which a computer program is stored, wherein the computer program implements the steps of the working machine control method when the processor executes the program.

In the working machine control method, the working machine control device, and the working machine provided by the present disclosure, reinforcement learning is performed by using the sample working state of the working machine, the sample decision behavior of the working machine, and the reward value corresponding to the sample decision behavior, the obtained state-behavior decision model can determine the current decision behavior of the working machine according to the current working state of the working machine, and the working machine is controlled to perform construction work according to the control signal corresponding to the current decision behavior. The reward value is determined based on the coincidence degree between the actual position curve and target position of the working portion of the working machine, so that the working portion of the working machine can perform construction according to the preset target position curve, and there is no need to establish an accurate control model for the working machine in each working state, which reduces the engineer's adjusting workload and shortens the adjusting time, the adjusting cost is reduced, and the intelligent construction level of the working machine is improved.

BRIEF DESCRIPTION OF THE DRAWINGS

In order to illustrate the technical solutions in the present disclosure or the prior art more clearly, the following briefly introduces the accompanying drawings that are needed in the description of the embodiments or the prior art. Obviously, the drawings in the following description are of the present disclosure. For some embodiments of the present application, for those of ordinary skill in the art, other drawings can also be obtained from these drawings without any creative effort.

DETAILED DESCRIPTION OF THE EMBODIMENTS

In order to make the purpose, technical solutions and advantages of the present disclosure clearer, the technical solutions in the present disclosure will be described clearly and completely below with reference to the accompanying drawings in the present disclosure. Obviously, the described embodiments are part of the embodiments of the present disclosure, not all embodiments. Based on the embodiments in the present disclosure, all other embodiments obtained by those of ordinary skill in the art without creative work fall within the protection scope of the present disclosure.

Reinforcement learning is an intelligent algorithm by which an artificial intelligence model is trained based on continuous "trial and error" and rewarding dominant strategies. Inspired by this, a technical solution in the embodiments of the present disclosure is that: an excavator starts to work automatically based on some random initial inputs, a reward is defined based on a difference between an actual trajectory and an expected ground-leveling path or slope-brushing path, a control strategy is iterated and optimized continuously, an artificial intelligence model (that is, a control algorithm) with a ground-leveling control function or a slope-brushing control function is finally realized, and this process replaces manual adjusting or calibrating of the control algorithm.

Figure 1:
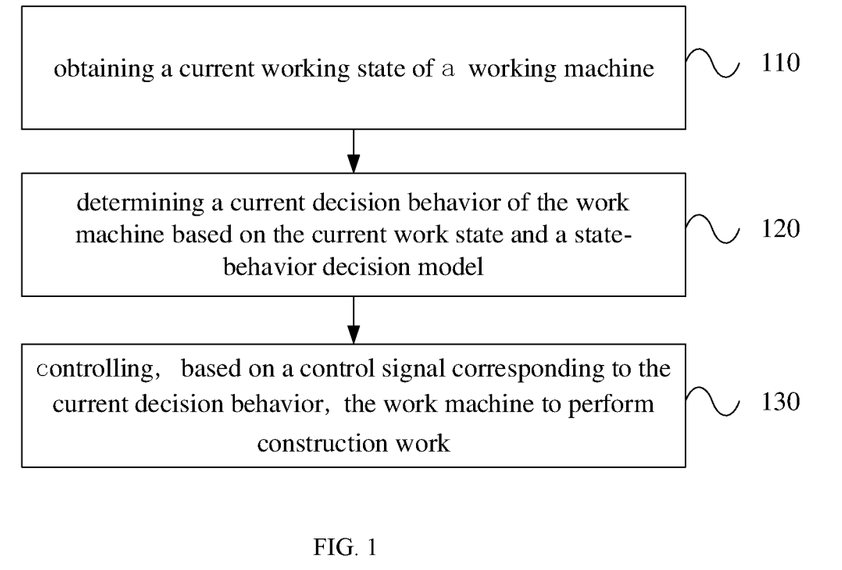
FIG. 1 is the schematic flow chart of a working machine control method provided by the present disclosure.

FIG. 1 is a schematic flowchart of a working machine control method provided by the present disclosure. As shown in FIG. 1, the method includes the following steps.

Step 110: obtaining a current working state of a working machine.

Specifically, the working machine may be a construction machine capable of performing construction work. For example, the working machine may be an excavator, a crane, a concrete pump truck, or a concrete mixer truck.

The current working state is a state parameter that can characterize the state of the working machine during the current construction work. For example, for an excavator, the current working state may be represented by the telescopic lengths and extension angles of the bucket, the stick, the boom, etc., which can be obtained by cylinder displacement sensors and inclination sensors installed on each machine arm of the excavator. Furthermore, the current working state may also include the attitude signal and the rotation angle signal of an upper body of the excavator, etc.

Step 120: determining a current decision behavior of the working machine based on the current working state and a state-behavior decision model. Here, the state-behavior decision model is obtained by training based on a sample working state of the working machine, a sample decision behavior of the working machine, and a reward value corresponding to the sample decision behavior; the reward value is determined based on an actual position curve of a working portion of the working machine and a target position curve of the working portion; the actual position curve is determined based on the sample decision behavior.

Specifically, the current decision behavior of the working machine may be the construction action performed by the working machine at the current moment. The working machine may have a plurality of candidate decision behaviors at the current moment, and the working machine needs to determine one candidate decision behavior as the current decision behavior. For example, when the excavator performs ground-leveling work, the candidate decision behaviors at the current moment may include inward retraction of the bucket, outward extension of the bucket, and so on.

Reinforcement learning can be used, the current working state of the working machine may be input into the state-behavior decision model, and the state-behavior decision model may analyze each parameter in the current working state to determine the current decision behavior of the working machine.

The sample working state of the working machine, the sample decision behavior of the working machine, and the reward value corresponding to the sample decision behavior can be collected; and the state-behavior decision model is obtained after the initial model is trained.

The operating principle of the state-behavior decision model is that: if the working machine makes a decision based on the current working state and the decision leads to an increase in its corresponding reward value, the tendency of the working machine to take this decision in the future will increase. The purpose of the state-behavior decision model is to discover the optimal decision behavior at each moment, so that the working machine can obtain the maximum reward value after taking the optimal decision behavior.

The working portion is the portion, of the working machine, working at the working surface when the working machine performs construction work. For example, for the excavator, the bucket is the working portion. For example, for a concrete pump truck, the front hose for outputting concrete is the working portion. For example, for a tamper, the rammer is the working portion.

The actual position curve of the working portion is the curve formed by the actual position of the working portion at each moment during the construction process. The actual position curve of the working portion can be determined according to the decision behavior. That is, the actual position curve of the working portion can be determined after the working machine performs, based on the control signal corresponding to the current decision behavior, the construction work. For example, the excavator controls each machine arm based on the control signal corresponding to the current decision behavior, and changes the displacement and inclination angle of each machine arm, so that the actual position of the bucket (i.e., the working portion) in contact with the working surface changes, thereby obtaining the actual position curve of the working portion of the excavator.

The target position curve of the working portion is the curve formed by the expected position of the working portion at each moment in the construction process. The target position curve can be determined according to the working task of the working machine. For example, for ground-leveling work, the target position curve of the excavator may be a straight line.

The reward value can be determined according to the actual position curve and target position curve of the working portion of the working machine. For example, for the excavator, the reward value can be determined according to the actual position curve and target position curve of the tooth tip of the bucket when performing construction work. First, it is to determine the coincidence degree between the actual position curve and the target position curve. The coincidence degree may be determined according to the distances between the corresponding points on the two curves. The smaller the distances between the corresponding points are, the higher the coincidence degree is; the greater the distances between the corresponding points are, the lower the coincidence degree is. If the coincidence degree of the two curves is relative high, it means that the bucket performs leveling ground or brushing slopes based on the target position curve, and a higher reward value should be obtained. If the coincidence degree of the two curves is relative lower, it means that the bucket performs leveling ground or brushing slopes not based on the target position curve, and a lower reward value should be obtained. The reward value is proportional to the coincidence degree, and different sizes of the reward value may be set according to the size of the coincidence degree.

Step 130: controlling, based on a control signal corresponding to the current decision behavior, the working machine to perform construction work.

Specifically, after obtaining the current decision behavior output by the state-behavior decision model, the working machine is controlled to perform construction work according to the control signal corresponding to the current decision behavior. For example, the current decision behavior may correspond to the opening-degree signal of the operating handle of the excavator. After the current decision behavior is obtained, the opening-degree signal of the operating handle of the excavator is obtained. According to the opening-degree signal of the operating handle, each machine arm of the excavator is controlled to move, so as to complete the construction operation at the current moment, and reciprocate until the construction work is completed.

In the working machine control method provided by the embodiments of the present disclosure, reinforcement learning is performed by using the sample working state of the working machine, the sample decision behavior of the working machine, and the reward value corresponding to the sample decision behavior, the obtained state-behavior decision model can determine the current decision behavior of the working machine according to the current working state of the working machine, and the working machine is controlled to perform construction work according to the control signal corresponding to the current decision behavior. The reward value is determined based on the coincidence degree between the actual position curve and target position of the working portion of the working machine, so that the working portion of the working machine can perform construction according to the preset target position curve, and there is no need to establish an accurate control model for the working machine in each working state, which reduces the engineer's adjusting workload and shortens the adjusting time, the adjusting cost is reduced, and the intelligent construction level of the working machine is improved.

Based on any one of the above embodiments, the reward value may be determined based on the following steps:

selecting a plurality of position points on the actual position curve, and determining a plurality of corresponding position points, respectively corresponding to the plurality of position points, on the target position curve;

determining a position weight of each position point;

determining the reward value based on a distance between each one of the plurality of position points and corresponding one of the plurality of corresponding position points as well as the position weight of each position point.

Specifically, a plurality of position points on the actual position curve are firstly selected. The plurality of position points may include the starting point of the curve, the midpoint of the curve, the end point of the curve, the inflection point of the curve, and so on. Furthermore, according to its shape, the curve may be segmented into multiple segments, and the plurality of position points may further include one or more segmented points. The embodiments of the present disclosure does not impose specific limitations on the selection of the position points.

After determining the plurality of position points, it is to determine, on the target position curve, a plurality of corresponding position points which respectively correspond to the plurality of position points. For example, the starting point of the actual position curve corresponds to the starting point of the target position curve, the end point of the actual position curve corresponds to the end point of the target position curve, the segment point of the actual position curve corresponds to the segment point of the target position curve, and so on.

The position weight of each position point can be determined according to the specific position of each position point on the actual position curve, and the position weight indicates the degree of influence of the position point on the shape of the curve. The larger the position weight is, the greater the influence of the position point on the curve shape is. For example, the position weights of the start, mid and end points may be set to be high weights, and the rest of the position points may be set to be low weights.

The reward value is determined according to the distance between each position point and its corresponding position point, as well as the position weight of each position point. For example, the sum of the products of the position weight of each position point and the distance between each position point and its corresponding position point can be calculated firstly, and then the reciprocal of the sum of the products may be used as the reward value.

Based on any one of the above embodiments, determining the reward value based on a distance between each one of the plurality of position points and corresponding one of the plurality of corresponding position points as well as the position weight of each position point may include the following steps:

based on the distance between each one of the plurality of position points and corresponding one of the plurality of corresponding position points as well as the position weight of each position point, determining a coincidence degree between the actual position curve and the target position curve;

determining the moving speed of the working portion on the actual position curve; and determining the reward value based on the coincidence degree and the moving speed.

Specifically, the coincidence degree between the actual position curve and the target position curve may be determined according to the distance between each position point and its corresponding position point as well as the position weight of each position point. For example, the coincidence degree is the reciprocal of the sum of the products of the distance between each position point and its corresponding position point as well as the position weight of each position point.

In addition to the coincidence degree, an additional indicator can be determined based on the moving speed of the working portion on the actual position curve, wherein the additional indicator may be used to determine the reward value. The faster the moving speed of the working portion on the actual position curve is, the higher the working efficiency is, and the higher the reward value is.

The moving speed of the working portion on the actual position curve can be determined according to the length of the actual position curve and the moving time of the working portion.

For example, a weighted sum is obtained according to the coincidence degree, the coincidence degree weight, the moving speed and the moving speed weight, and then the weighted sum is used as the reward value.'

According to any one of the above embodiments, the state-behavior decision model is obtained by training based on the following steps:

obtaining the previous working state of the working machine, the previous decision behavior of the working machine, and the reward value corresponding to the previous decision behavior;

taking the previous working state, the previous decision behavior, and the reward value corresponding to the previous decision behavior as the sample working state, the sample decision behavior, and the reward value corresponding to the sample decision behavior, respectively; and training, based on the sample working state, the sample decision behavior, and the reward value corresponding to the sample decision behavior, the initial model to obtain the state-behavior decision model.

Specifically, the initial model of the state-behavior decision model may use a policy network (Policy Network), a deep Q-network (Deep Q-Network), etc. The embodiments of the present disclosure does not specifically limit the type of the initial model.

The state-behavior decision model can be obtained by training, and specifically, it can be obtained by the following training method.

Firstly, the previous working state of the working machine, the previous decision behavior of the working machine, and the reward value corresponding to the previous decision behavior are collected in real time. The previous working state is the working state at the previous moment, and the previous decision behavior is the decision behavior at the previous moment. The previous working state, the previous decision behavior, and the reward value corresponding to the previous decision behavior are taken as the sample working state, the sample decision behavior, and the reward value corresponding to the sample decision behavior, respectively. These sample data may all come from real-time data when the working machine is executing the current construction work.

In addition, the sample data may also come from historical data obtained when the working machine performed construction work.

Secondly, according to the sample working state, the sample decision behavior, and the reward value corresponding to the sample decision behavior, the initial model is trained to improve the ability of the initial model to predict the optimal decision behavior, so that and the state-behavior decision model is obtained.

The working machine control method provided by the embodiments of the present disclosure can obtain the state-behavior decision model after training the initial model through the real-time data of the working machine, and can realize continuous training. When the real-time data of working machine performing the current construction working is used for training, the next action can be adjusted according to the real-time data, which greatly shortens the adjusting process.

According to any one of the above embodiments, training, based on the sample working state, the sample decision behavior, and the reward value corresponding to the sample decision behavior, the initial model to obtain the state-behavior decision model, includes:

- based on the sample working state, the sample decision behavior, and the reward value corresponding to the sample decision behavior, training the initial model to determine the actual position curve of the working portion of the working machine; and
- if the coincidence degree between the actual position curve and the target position curve of the working portion of the working machine is less than the preset coincidence threshold, stopping training, and using the initial model trained as the state-behavior decision model.

Specifically, if after the working machine performs the construction work according to the control signal corresponding to the current sample decision behavior, the actual position curve of the working portion can be obtained and the coincidence degree between the actual position curve of the working portion and the target position curve of the working portion is smaller than the preset coincidence threshold, it is indicates that the training of the current initial model has reached the training purpose, and the training can be stopped.

If the coincidence degree between the actual position curve and the target position curve of the working portion is greater than or equal to the preset coincidence threshold, it indicates that the training of the current initial model has not yet achieved the training purpose, and the training should be continued. In this case, the current sample decision behavior can be updated, and the training can be repeated iteratively until the coincidence degree is less than the preset coincidence threshold.

The preset coincidence threshold can be set according to actual needs.

Based on any one of the above embodiments, the target position curve of the working portion of the working machine may be determined based on the construction task performed by the working machine.

Specifically, the construction task is the work item undertaken by the working machine. For example, for the excavator, its construction tasks may include leveling ground, brushing slopes, and excavation.

The target position curve of the working portion is the curve formed by the expected position of the working portion at each moment in the construction process. The target position curve can be determined according to the working task of the working machine. For example, for ground-leveling working, the target position curve of the excavator may be a straight line on the horizontal plane. For slope-brushing working, the target position curve of the excavator may be a straight line inclined to the horizontal plane. For excavation working, the target position curve of the excavator may be a curve.

Based on any one of the above embodiments, the state-behavior decision model is stored in the memory of the working machine in the form of a computer program, and is used for the processor of the working machine to read and execute.

Specifically, the state-behavior decision model can be used as a control algorithm and stored in the memory of the working machine in the form of a computer program. The processor of the working machine can read the computer program in the memory and execute the working machine control method.

Based on any one of the above embodiments, the working machine is an excavator, and the current working state includes the attitude parameters of the machine arms, the attitude parameter of the upper body, and the rotation angle of the upper body.

Specifically, the working machine in the embodiments of the present disclosure may be an excavator, and correspondingly, the current working state may include the attitude parameters of the machine arms, the attitude parameter of the upper body, and the rotation angle of the upper body.

The attitude parameter of each machine arm may include the telescopic length of each machine arm and the extension angle of each machine arm. The machine arms here may include the boom, the stick and the bucket. The telescopic length of each machine arm can be obtained through the corresponding cylinder length sensor, and the extension angle of each machine arm can be obtained through the corresponding inclination angle sensor.

The attitude parameter of the upper body may be the three-dimensional attitude angle of the body portion of the excavator, which can be obtained by the gyroscope installed on the rotary platform.

The rotation angle of the upper body may be the inclination angle of the body portion of the excavator relative to the chassis portion of the excavator, which can be determined by the angle between the extension direction of the boom on the rotary platform and the forward direction of the excavator.

The current working state may also include other parameters installed in the excavator that can determine the working state of the excavator, for example, the moving speed of the excavator and the moving direction of the excavator.

Based on any one of the above embodiments, the control signal may be the opening-degree signal of the handle of the excavator.

Specifically, for the excavator, controlling each machine arm to perform construction work is mainly achieved by controlling the opening-degree of the handle. For example, the excavator may include a left operating handle and a right operating handle. The left operating handle controls the stick and the rotary platform, and the right operating handle controls the boom and the bucket. The opening-degree signal of the handle controls the action of the corresponding machine arm.

Based on any one of the above embodiments, the present disclosure provides an control method of an excavator performing leveling ground and brushing slopes based on reinforcement learning. The method includes the following steps.

In step 1, the state parameter group required by the reinforcement learning model is defined. Here, the state parameter group may include the machine arm attitude sensor signal (obtained by a cylinder displacement sensor or an inclination sensor), the upper body attitude signal, the upper body rotation angle signal, etc., that is, the combination of these parameters can uniquely determine the current state parameter group of the excavator.

In step 2, the strategy function is defined. The input of the strategy function is the current state parameter group (part or whole), and the output is the corresponding control signal (the handle opening-degree signal) output. The coefficient matrix connecting the input and output parameters is part of the trainable model for this reinforcement learning.

In step 3, the reward function is defined. The smaller the distance between the actual tooth tip position curve and the expected curve is, the higher the coincidence degree of the two curves is, the greater the reward value is.

Figure 2:
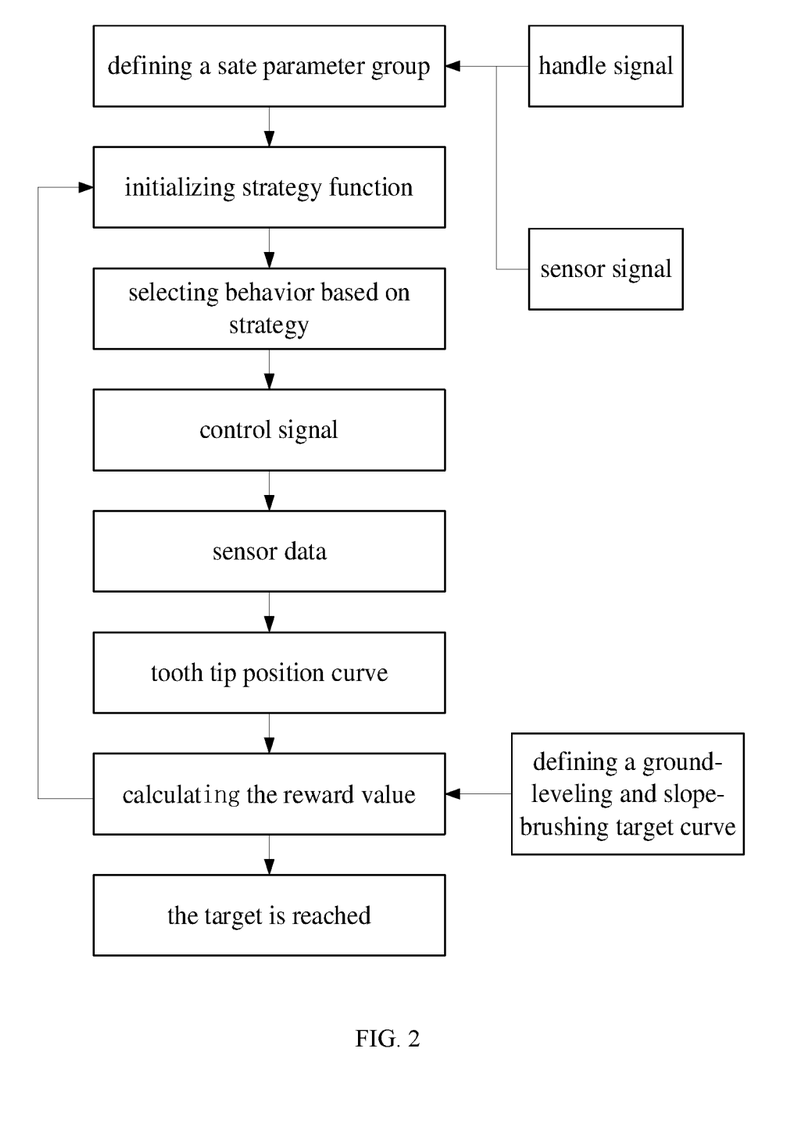
FIG. 2 is a schematic diagram of the training of an excavator control model for leveling ground and brushing slopes provided by the present disclosure.

In step 4, a corresponding automatic development and adjustment program is generated. FIG. 2 is a schematic diagram of the training of an excavator control model for leveling ground and brushing slopes provided by the present disclosure. As shown in FIG. 2, the training and adjusting process of the control model may include the following steps: acquiring sensor signals such as handle signal, digital oil cylinder signal, and IMU (inertial sensor) signal, which are stored in the current state array; outputting the control signal through the measurement function; calculating the tooth tip position curve through the signal(s) returned by the sensor(s); calculating the reward value by combining the obtained curve with the expected tooth tip curve; judging, based on the reward value, whether the target is reached: a) if the target is reached, stopping the training; b) if the target is not reached, updating the policy function and iterating repeatedly until the goal is reached.

Figure 3:
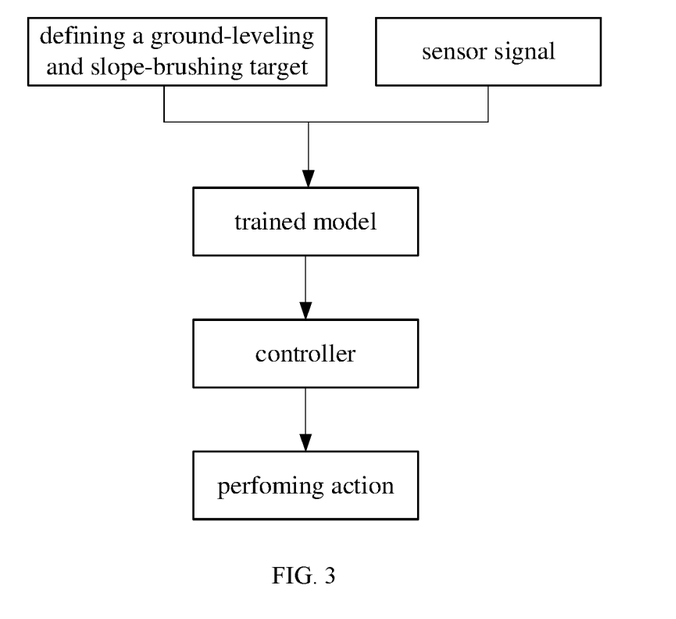
FIG. 3 is a schematic diagram of the deployment of the excavator leveling ground and brushing slopes control model provided by the present disclosure.

In step 5, as shown in FIG. 3 which is a schematic diagram of the deployment of the excavator ground-leveling and slope-brushing control model provided by the present disclosure, after the training of the intensive computing model is completed, the intensive computing model may be directly deployed in the controller in a embodded manner. The function of the intensive computing model is similar to a control algorithm, which takes the real-time collected state parameters as input, and outputs the real-time control signal.

The control method used for excavator performing leveling ground and brushing slopes based on reinforcement learning provided by the embodiments of the present disclosure has the following advantages.

1. After setting the automatic reinforcement learning training program, the excavator can automatically adjust the control algorithm without human intervention, and traverse all state points for optimization, which greatly reduces the workload of control algorithm adjusting and reduces the cost of adjusting.
2. Since continuous adjusting can be realized, the accuracy can reach or exceed manual adjusting compared with manual adjusting, and since the next action is adjusted according to the returned data in real time, the time required for the entire adjusting process will be greatly shortened.
3. The developed control program will accelerate the development of the control algorithm of the subsequent excavator versions. The trained artificial intelligence model has a characteristic: the model can be migrated to similar application scenarios, and can match new application scenarios with only simpler training, that is, the transfer learning. Therefore, it can greatly speed up the development of the ground-leveling and slope-brushing control algorithms for new excavator versions.
4. The model developed based on reinforcement learning is a black-box model rather than a logical mechanism model, and it is not easy to be copied or reverse engineered.

Figure 4:
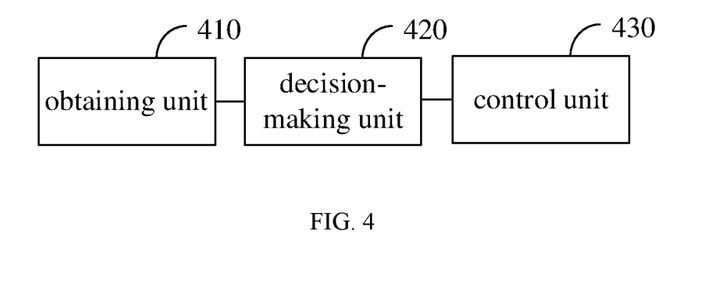
FIG. 4 is a schematic diagram of a working machine control device provided by the present disclosure.

Based on any one of the above embodiments, FIG. 4 is a schematic diagram of a working machine control device provided by the present disclosure. As shown in FIG. 4, the device includes:
- an obtaining unit 410, configured to obtain a current working state of a working machine;
- a decision-making unit 420, configured to determine a current decision behavior of the working machine based on the current working state and a state-behavior decision model; and
- a control unit 430, configured to control, based on a control signal corresponding to the current decision behavior, the working machine to perform construction work.

Here, the state-behavior decision model is obtained by training based on a sample working state of the work machine, a sample decision behavior of the work machine, and a reward value corresponding to the sample decision behavior; the reward value is determined based on an actual position curve of a working portion of the working machine and a target position curve of the working portion; the actual position curve is determined based on the sample decision behavior.

In the working machine control device provided by the embodiments of the present disclosure, reinforcement learning is performed by using the sample working state of the working machine, the sample decision behavior of the working machine, and the reward value corresponding to the sample decision behavior, the obtained state-behavior decision model can determine the current decision behavior of the working machine according to the current working state of the working machine, and the working machine is controlled to perform construction work according to the control signal corresponding to the current decision behavior. The reward value is determined based on the coincidence degree between the actual position curve and target position of the working portion of the working machine, so that the working portion of the working machine can perform construction according to the preset target position curve, and there is no need to establish an accurate control model for the working machine in each working state, which reduces the engineer's adjusting workload and shortens the adjusting time, the adjusting cost is reduced, and the intelligent construction level of the working machine is improved.

Based on any one of the above embodiments, it also includes:
- a reward determination unit, configured to: select a plurality of position points on the actual position curve, and determine a plurality of corresponding position points, respectively corresponding to the plurality of position points, on the target position curve; determine a position weight of each position point; and determine the reward value based on the distance between each one of the plurality of position points and corresponding one of the plurality of corresponding position points as well as the position weight of each position point.

Based on any one of the above embodiments, the reward determination unit is specifically used for:
- based on the distance between each position point and its corresponding position point as well as the position weight of each position point, determining the coincidence degree between the actual position curve and the target position curve;

determining the moving speed of the working portion on the actual position curve; and determining the reward value based on the coincidence degree and the moving speed.

Based on any one of the above embodiments, it also includes:

a training unit, configured to: obtain the previous working state of the working machine, the previous decision behavior of the working machine, and the reward value corresponding to the previous decision behavior;

take the previous working state, the previous decision behavior, and the reward value corresponding to the previous decision behavior as the sample working state, the sample decision behavior, and the reward value corresponding to the sample decision behavior, respectively; and train, based on the sample working state, the sample decision behavior, and the reward value corresponding to the sample decision behavior, the initial model to obtain the state-behavior decision model.

Based on any one of the above embodiments, the training unit is further used for:

training, based on the sample working state, the sample decision behavior, and the reward value corresponding to the sample decision behavior, the initial model to determine the actual position curve of the working portion of the working machine; and if the coincidence degree between the actual position curve and the target position curve of the working portion of the working machine is less than the preset coincidence threshold, stopping training, and using the initial model trained as the state-behavior decision model.

Based on any one of the above embodiments, the target position curve of the working portion of the working machine may be determined based on the construction task performed by the working machine.

Based on any one of the above embodiments, the working machine is an excavator, and the current working state includes the attitude parameters of the machine arms, the attitude parameter of the upper body, and the rotation angle of the upper body.

Based on any one of the above embodiments, the control signal is the opening-degree signal of a handle of the excavator.

Based on any one of the foregoing embodiments, an embodiment of the present disclosure further provides a working machine, wherein the working machine includes the foregoing working machine control device.

Specifically, the working machine may include the above working machine control device. The above control device is used to control the working machine, so that it can replace manual control, and can adjust the next construction action according to the real-time return data, thereby shortening the adjusting process.

Figure 5:
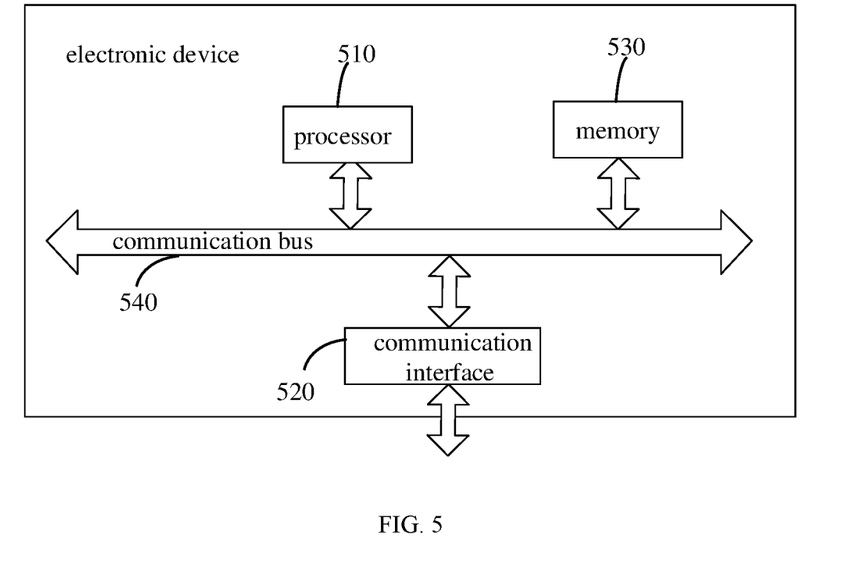
FIG. 5 is a schematic diagram of an electronic device provided by the present disclosure.

Based on any one of the above embodiments, as shown in FIG. 5 which is a schematic diagram of an electronic device provided by the present disclosure. the electronic device may include: a processor 510, a communication interface 520, a memory 530 and a communication bus 540. The processor 510, the communication interface 520, and the memory 530 communicate with each other through the communication bus 540. The processor 510 can call logic commands in the memory 530 to perform the following method:

obtaining a current working state of a working machine; based on the current working state and a state-behavior decision model, determining a current decision behavior of the working machine; controlling, based on a control signal corresponding to the current decision behavior, the working machine to perform construction work. Here, the state-behavior decision model is obtained by training based on a sample working state of the working machine, a sample decision behavior of the working machine and a reward value corresponding to sample decision behavior; the reward value is determined based on an actual position curve and target position curve of a working portion of the working machine, and the actual position curve is determined based on the sample decision behavior.

In addition, the above logic commands in the memory 530 can be implemented in the form of software functional units and can be stored in a computer-readable storage medium when sold or used as an independent product. Based on this understanding, the technical solution of the present disclosure, or the part that contributes to the prior art or the part of the technical solution can be embodied in the form of a software product in essence. The computer software product is stored in a storage medium, including several commands are used to cause a computer device (which may be a personal computer, a server, or a network device, etc.) to execute all or part of the steps of the methods described in the various examples of the present disclosure. The storage medium includes: U disk, mobile hard disk, read-only memory, random access memory, magnetic disk or optical disk and other media that can store program codes.

The processor of the electronic device provided by the embodiments of the present disclosure can call the logic instructions in the memory to implement the above method.

The embodiments of the present disclosure also provide a non-transitory computer-readable storage medium on which a computer program is stored, and the computer program is implemented by the processor to execute the methods provided by the above embodiments. For example, the method may include:

obtaining a current working state of a working machine; based on the current working state and a state-behavior decision model, determining a current decision behavior of the working machine; controlling, based on a control signal corresponding to the current decision behavior, the working machine to perform construction work. Here, the state-behavior decision model is obtained by training based on a sample working state of the working machine, a sample decision behavior of the working machine and a reward value corresponding to sample decision behavior; the reward value is determined based on an actual position curve and target position curve of a working portion of the working machine, and the actual position curve is determined based on the sample decision behavior.

When the computer program stored on the non-transitive computer-readable storage medium provided by the embodiments of the present disclosure is executed, the method is realized, and the specific implementation mode thereof is consistent with the implementation mode of the method, and the same beneficial effect can be achieved, which will not be repeated here.

The embodiments of the device described above are only illustrative, the units described as separate components may or may not be physically separated, and the components shown as units may or may not be physical units, that is, they may be located in one place, or can be distributed over a plurality of network elements. Some or all of the units may be selected according to actual needs to achieve the purpose of the solution in this example. Those of ordinary skill in the art can understand and implement it without creative effort.

From the description of the above embodiments, those skilled in the art can clearly understand that each example can be implemented by means of software plus a necessary general hardware platform, and certainly can also be implemented by hardware. Based on this understanding, the above technical solutions or the parts that make contributions to the prior art can be embodied in the form of software products in essence, and the computer software products can be stored in computer-readable storage media, such as ROM/RAM, magnetic A disc, an optical disc, etc., includes several commands to cause a computer device (which may be a personal computer, a server, or a network device, etc.) to perform the methods described in various examples or some parts of the examples.

Finally, it should be noted that the above examples are only used to illustrate the technical solutions of the present disclosure, but not to limit them; although the present disclosure has been described in detail with reference to the foregoing examples, those of ordinary skill in the art should understand that: the technical solutions described in the foregoing examples can still be modified, or some technical features thereof are equivalently replaced; and these modifications or replacements do not make the essence of the corresponding technical solutions deviate from the spirit and scope of the technical solutions in the examples of the present disclosure.

What is claimed is:

1. A working machine control method using target position curve and reward model, comprising:
    obtaining a current working state of a working machine;
    determining a current decision behavior of the work machine based on the current work state and a state-behavior decision model; and
    controlling, based on a control signal corresponding to the current decision behavior, the work machine to perform construction work;
    wherein the state-behavior decision model is obtained by training based on a sample working state of the work machine, a sample decision behavior of the work machine, and a reward value corresponding to the sample decision behavior; the reward value is determined based on an actual position curve of a working portion of the working machine and a target position curve of the working portion; the actual position curve is determined based on the sample decision behavior; the reward value is determined based on a coincidence degree between the actual position curve and the target position curve and is positively related to the coincidence degree;
    the coincidence degree is determined based on the following steps:
    selecting a plurality of position points on the actual position curve, and determining a plurality of corresponding position points, respectively corresponding to the plurality of position points, on the target position curve;
    determining a position weight of each position point, the position weights of the start, mid and end points being greater than the weights of the rest of the position points; and
    determining the coincidence degree based on the reciprocal of the sum of the products of a distance between each one of the plurality of position points and corresponding one of the plurality of corresponding position points as well as the position weight of each position point.

2. The working machine control method according to claim 1, wherein the plurality of position points comprise any one of a starting point of the actual position curve, a midpoint of the actual position curve, an end point of the actual position curve, and an inflection point of the actual position curve.

3. The working machine control method according to claim 2, wherein the plurality of position points further comprise one or more segmented points.

4. The working machine control method according to claim 1, wherein the reward value is determined based on the following steps:
    determining the coincidence degree between the actual position curve and the target position curve;
    determining a moving speed of the working portion on the actual position curve; and
    determining the reward value based on the coincidence degree and the moving speed.

5. The working machine control method according to claim 4, wherein the reward value is positively related to the coincidence degree and the moving speed.

6. The working machine control method according to claim 4, wherein the determining the reward value based on the coincidence degree and the moving speed comprises:
    obtaining a weighted sum based on the coincidence degree, a coincidence-degree weight, the moving speed, and a moving-speed weight; and
    determining the weighted sum as the reward value.

7. The working machine control method according to claim 1, wherein the state-behavior decision model is obtained by training based on the following steps:
    obtaining a last working state of the working machine, a last decision behavior of the working machine, and a reward value corresponding to the last decision behavior;
    taking the last working state, the last decision behavior, and the reward value corresponding to the last decision behavior as the sample working state, the sample decision behavior, and the reward value corresponding to the sample decision behavior, respectively; and
    training, based on the sample working state, the sample decision behavior, and the reward value corresponding to the sample decision behavior, an initial model to obtain the state-behavior decision model.

8. The working machine control method according to claim 7, wherein the training, based on the sample working state, the sample decision behavior, and the reward value corresponding to the sample decision behavior, an initial model to obtain the state-behavior decision model comprises:
    stopping training if the coincidence degree between the actual position curve and the target position curve of the working portion of the working machine is smaller than a preset coincidence threshold, and taking the initial model trained as the state-behavior decision model.

9. The working machine control method according to claim 1, wherein the working machine is an excavator.

10. The working machine control method according to claim 9, wherein the current working state comprises attitude parameters of machine arms, an attitude parameter of an upper machine body, and a rotation angle of the upper machine body.

11. The working machine control method according to claim 10, wherein the machine arms comprises a boom, a stick, and a bucket.

12. The working machine control method according to claim 9, wherein the working portion is a bucket of the excavator.

13. An electronic device, comprising:
a memory;
a processor; and
a computer program stored on the memory and executable on the processor,
wherein the processor implements the steps of the working machine control method according to claim 1 when the processor executes the program.

14. A working machine, comprising the electronic device according to claim 13.

15. A non-transitory computer-readable storage medium on which a computer program is stored, wherein the computer program implements the steps of the working machine control method according to claim 1 when the processor executes the program.

* * * * *